Patented Nov. 6, 1951

2,573,726

UNITED STATES PATENT OFFICE 2,573,726

CATALYTIC DESULPHURISATION OF NAPHTHAS

Frederick William Bertram Porter and Frank Robert George Green, Sunbury-on-Thames, England, assignors to Anglo-Iranian Oil Company Limited, London, England, a British joint-stock corporation No Drawing. Application June 29, 1948, Serial No. 35,976. In Great Britain June 30, 1947

14 Claims. (Cl. 196—28)

This invention relates to the catalytic desulphurisation of naphthenic naphthas.

It is known to desulphurise hydrocarbons by passing them in admixture with hydrogen over a sulphur-resistant desulphurisation catalyst at elevated temperature and pressure whereby organic sulphur compounds present in the hydrocarbons are hydrogenated to form hydrogen sulphide which can be readily removed from the treated hydrocarbons. The process as normally carried out involves a net consumption of hydrogen and the cost of supplying the hydrogen is a major factor in the economics of the process. Furthermore in order to secure the necessary partial pressure of hydrogen, it has generally been considered necessary to operate at elevated pressure ranging from 500–1000 lb./sq. in. or more, and a plant to withstand such pressures has to be made from special steels which are comparatively expensive.

It is well known that the hydroforming process effects considerable desulphurisation and at the same time produces hydrogen mainly by dehydrogenation of the naphthenes present. This process, however, does not constitute an economic desulphurisation process in view of the fact that the reaction conditions are so severe that the catalyst has a very short active life and needs to be regenerated at short intervals of about 6 hours, while the increased production of aromatics is in many cases undesirable. It has also been proposed to treat a catalytically cracked naphtha in admixture with a straight-run naphtha, the latter being dehydrogenated under the conditions of the reaction to provide hydrogen for the hydrogenation of unsaturated components of the cracked naphtha. If the cracked naphtha contains sulphur, the sulphur is removed to some extent but the process is not primarily a desulphurisation process.

The invention has among its objects to provide a process for the desulphurisation of naphthenic naphthas which can be carried out without the use of hydrogen added from an external source. It is also an object of the invention to enable such a process to be carried out at pressures low enough to avoid the use of special pressure-resisting steels, thereby reducing the cost of the plant.

It has now been found that by careful control of the reaction conditions and by selecting a suitable catalyst it is possible to effect desulphurisation of naphthenic naphthas without adding hydrogen from an external source, the hydrogen necessary for the conversion of the sulphur contained in the feedstock into hydrogen sulphide being derived from the feedstock itself. It has also been found that by careful control of the reaction conditions it is possible to secure a very long catalyst life with the necessity for only occasional regenerations while maintaining a high degree of desulphurisation.

According to the invention, the desulphurisation of a naphthenic naphtha boiling up to 200° C. is effected by passing the naphtha in vapour form and in admixture with hydrogen over a catalyst which is active under the reaction conditions employed for both the dehydrogenation of naphthenes and the hydrogenation of organic sulphur compounds, at a temperature and at a pressure such that a considerable proportion of the combined sulphur contained in the naphtha is converted into hydrogen sulphide and hydrogen is produced by dehydrogenation of the naphthenes contained in the naphtha in an amount exceeding that required to effect the conversion of the combined sulphur contained in the naphtha into hydrogen sulphide, separating a hydrogen-rich gas mixture from the treated naphtha, and recycling said hydrogen-rich gas mixture to the reaction zone to constitute the whole of the hydrogen supplied to said zone and at a rate sufficient to maintain the necessary partial pressure of hydrogen therein.

It is believed that the reaction proceeds by dehydrogenation of some of the naphthenes to produce hydrogen in excess of that required to convert the combined sulphur present into hydrogen sulphide and the reaction conditions for any particular feedstock must therefore be determined having regard to any limiting conditions imposed by these two reactions. Thus, there is a lower temperature, of about 650° F. below which little dehydrogenation would occur and below which the reaction would not be self-supporting in hydrogen. This lower temperature depends to some extent on the sulphur content and the higher the sulphur content the higher the minimum temperature necessary to provide sufficient hydrogen. At temperatures above about 800° F., dehydrogenation occurs to such an extent that the product becomes increasingly aromatic. Furthermore at temperatures above about 800° F. the on-stream time before regeneration is reduced. The preferred temperature of operation is to some extent dependent on the pressure employed which is preferably between 25 and 500 lb./sq. in. As the pressure is increased the minimum temperature at which satisfactory dehydrogenation of the naphthenes can be obtained increases, and if at a fixed temperature the pressure is sufficiently increased, the reverse reaction of hydrogenation of aromatics begins to occur, e. g. at 650–700° F. and 500 p. s. i. gauge pressure. Thus, when operating at the higher pressures in the preferred range, it is desirable to use higher temperatures. Similarly it is desirable to avoid the combination of high temperature and low pressure, since such conditions (e. g. 800° F. and 25 p. s. i. gauge) lead to a short onstream time for satisfactory operation.

The space velocity may be varied according to the degree of desulphurisation required but space velocities above 10 v./v./hr. result in a low degree of desulphurisation.

Operating under the conditions above described, the gases separated by cooling the treated naphtha at reaction pressure contain 70–80% by volume of hydrogen and are continuously recycled to the reaction zone. It has been found that the hydrogen sulphide contained in the separated gas builds up to an equilibrium concentration whereafter the gases may be recycled to the reaction zone without further increase in the content of hydrogen sulphide which is thereafter dissolved in the product until such time as it is depressurised. If desired, however, the hydrogen sulphide may be removed from the gas and the H2S free gas recycled to the reaction zone by any of the usual methods. The gases may be submitted to treatment for increasing the relative proportion of hydrogen therein, as by passage through an oil tower. It is not necessary to supply extraneous hydrogen to the reaction zone when starting the process as the gases separated from the treated naphtha may be allowed to build up to form the recycle gas.

The preferred catalyst consists of cobalt molybdate supported on alumina, although cobalt molybdate type catalysts of lesser activity may be used. as for example, pelleted catalysts containing a mixture of cobalt and molybdenum oxides. For example, a pelleted catalyst was prepared by mixing powdered cobalt oxide, molybdic oxide and alumina and pelleting with 1% graphite into 1/16" pellets. The pellets were treated for two hours at 550° C. Such a catalyst is not as effective as the supported type of cobalt molybdate catalyst but the same degree of desulphurisation could probably be achieved by reducing the space velocity. The catalyst could also be prepared by extrusion.

Other sulphur-resistant catalysts which are active for the dehydrogenation of naphthenes and the hydrogenation of organic sulphur compounds under the reaction conditions may also be employed. Examples of such other catalysts are molybdenum oxide on alumina, tungsten nickel sulphide and molybdenum sulphide.

The following is an example of the method of operating the process according to the invention.

*Example*

A straight run Iranian naphtha of 150° C. end point was passed through a preheater maintained at 750° F. together with recycle gas containing approximating 67% by volume of hydrogen at the rate of 1600 cu. ft./bbl. The vapours were passed downwards over a bed of catalyst consisting of cobalt molybdate on alumina at a pressure of 50 lb./sq. in. and at a feedstock rate of 1.0 v./v./hr. The products were cooled at the operating pressure and the liquid product withdrawn and given a light soda wash to remove dissolved hydrogen sulphide. This liquid product required no rerunning. The gas mixture separated had a density (air=1) of 0.382 and the gas make was sufficient to maintain a recycle gas as stated above. The net hydrogen make amounted to 64 C. F./B.

The following table gives the inspection data of feedstock and product:

| | Feedstock | Product |
|---|---|---|
| S. G. @ 60° F | 0.7095 | 0.7215 |
| Distn.: | | |
| I. B. P., °C | 30 | 36 |
| 2% | 39 | 46 |
| 5% | 47 | 53.5 |
| 10% | 55 | 61 |
| 20% | 72 | 79 |
| 30% | 86 | 92 |
| 40% | 99.5 | 100.5 |
| 50% | 108 | 109 |
| 60% | 116 | 116 |
| 70% | 124 | 123 |
| 80% | 132.5 | 131 |
| 90% | 145 | 141.5 |
| F. B. P. | 154 | 160 |
| Vol. Per Cent to 70° C | 18.5 | 15 |
| Vol. Per Cent to 100° C | 41 | 39 |
| Vol. Per Cent to 140° C | 87 | 89 |
| Loss | 4.5 | 1.5 |
| Bromine Number | 1 | 3 |
| Aromatics, Weight Per Cent | 10.0 | 14.4 |
| Aniline Pts.: | | |
| (1) °C | 51.9 | 51.4 |
| (2) | 63.7 | 64.7 |
| Sulphur, Weight Per Cent | 0.091 | 0.0009 |
| Octane Number, M. M | 59.5 | 61.5 |
| Est. Octane No. +3.5 ccs. TEL | 76 | 80 |
| Weight Per Cent on Feed | 100 | ¹97 |

¹ No precautions were taken to avoid loss of light ends.

We claim:

1. In a continuous process for the hydrocatalytic desulphurisation of a sulphur- and naphthene-containing straight-run naphtha wherein the naphtha is contacted in a reaction zone at an elevated temperature and pressure in the presence of hydrogen with a dehydrogenation-hydrogenation catalyst which is immune to sulphur poisoning and combines activity for the dehydrogenation of naphthenes to aromatics with activity for the hydrogenation of organically combined sulphur in the naphtha to hydrogen sulphide, the method of operating the process so that it will be self-supporting with respect to the amount of hydrogen needed and produce product naphtha having, except for lowered sulphur content, properties and boiling range substantially the same as the feedstock, comprising the steps of passing the naphtha to be treated through said reaction zone and contacting the naphtha therewith with said catalyst and with hydrogen derived solely from the naphtha, maintaining a selected temperature in said zone between about 650° F. to about 800° F. at which hydrogen is continuously produced from said naphtha, maintaining a selected pressure in said zone between about 25 to about 500 lb./sq. in. gauge, said selected temperature and pressure being correlated to provide a net production of hydrogen at least sufficient to maintain the pressure in said zone substantially constant, separating a hydrogen-rich gas mixture from the treated naphtha, recycling said hydrogen-rich gas mixture to the reaction zone to constitute the whole of the hydrogen supplied to said zone, the hydrogen recycle rate being sufficient to maintain the necessary partial pressure of hydrogen in said zone, and recovering the desired product naphtha from the residue of said separating operation.

2. In a continuous process for the hydrocatalytic desulphurisation of a sulphur- and naphthene-containing straight-run naphtha wherein the naphtha is contacted in a reaction zone at an elevated temperature and pressure in the presence of hydrogen with a dehydrogenation-hydrogenation catalyst which is immune to sulphur poisoning and combines activity for the dehydrogenation of naphthenes to aromatics with activity for the hydrogenation of organically-combined sulphur in the naphtha to hydrogen sulphide, the method of operating the process so that it will be self-supporting with respect to the amount of hydrogen needed to produce product naphtha having, except for lowered sulphur content, properties and boiling range substantially the same as the feedstock, comprising the steps of passing the naphtha to be treated through said reaction zone and contacting the naphtha therein with a catalyst comprising the combined oxides of cobalt and molybdenum supported on alumina, and with hydrogen derived solely from the naphtha, maintaining a selected temperature in said zone of approximately 750° F. at which hydrogen is continuously produced from said naphtha, maintaining a selected pressure in said zone of approximately 50 p. s. i. gauge, said temperature and pressure being correlated to provide a net production of hydrogen at least sufficient to maintain the pressure in said zone substantially constant, separating a hydrogen-rich gas mixture from the treated naphtha, recycling said hydrogen-rich gas mixture to the reaction zone to constitute the whole of the hydrogen supplied to said zone, the hydrogen recycle rate being sufficient to maintain the necessary partial pressure of hydrogen in said zone, separating hydrogen sulphide from the treated naphtha, and recovering the desired product naphtha from the residue of said separating operation.

3. In a continuous process for the hydrocatalytic desulphurisation of a sulphur- and naphthene-containing hydrocarbon oil wherein the oil is contacted in a reaction zone at an elevated temperature and pressure in the presence of hydrogen with a dehydrogenation-hydrogenation catalyst which is immune to sulphur poisoning and combines activity for the dehydrogenation of naphthenes to aromatics with activity for the hydrogenation of organically combined sulphur in the oil to hydrogen sulphide, the method of operating the process so that it will be self-supporting with respect to the amount of hydrogen needed and produce product oil having, except for lowered sulphur content, properties and boiling range substantially the same as the feedstock comprising the steps of passing the oil to be treated through said reaction zone and contacting the oil therein with said catalyst and with hydrogen derived solely from the oil, maintaining a selected temperature in said zone between about 650° F. to about 800° F. at which hydrogen is continuously produced from said oil, maintaining a selected pressure in said zone between about 25 to about 500 lb./sq. in. gauge, said selected temperature and pressure being correlated to provide a net production of hydrogen at least sufficient to maintain the pressure in said zone substantially constant, separating a hydrogen-rich gas mixture from the treated oil, recycling said hydrogen-rich gas mixture to the reaction zone to constitute the whole of the hydrogen supplied to said zone, the hydrogen recycle rate being sufficient to maintain the necessary partial pressure of hydrogen in said zone, and recovering the desired product oil from the residue of said separating operation.

4. The process of claim 1 in which at least 90% of the combined sulphur contained in the naphtha is converted into hydrogen sulphide.

5. The process of claim 1 including the step of removing hydrogen sulphide from the treated naphtha after separation of said hydrogen-rich gas mixture therefrom.

6. The process of claim 1 wherein separation of said hydrogen-rich gas mixture from the treated naphtha is effected by cooling said treated naphtha at the reaction pressure, whereby the content of hydrogen sulphide in said separated gas mixture may build up to an equilibrium concentration in said mixture being recycled to the reaction zone, without further increase in the content of hydrogen sulphide which is thereafter dissolved in the treated naphtha until such time as it is depressured.

7. The process of claim 1 in which said catalyst is cobalt molybdate supported on a carrier.

8. The process of claim 1 in which said catalyst is cobalt molybdate supported on alumina.

9. The process of claim 1 in which said catalyst comprises a mixture of cobalt and molybdenum oxides.

10. The process of claim 1 in which said catalyst is in the form of pellets containing a mixture of cobalt and molybdenum oxides.

11. The process of claim 1 in which said catalyst is in the form of pellets prepared by mixing powdered cobalt oxide, molybdic oxide and alumina, pelleting said mixture with about 1% graphite and treating the pellets thus obtained for about two hours at about 550° C.

12. The process of claim 1 in which said catalyst is molybdenum oxide on alumina.

13. The process of claim 1 in which said catalyst is tungsten nickel sulphide on alumina.

14. The process of claim 1 in which said catalyst is molybdenum sulphide on alumina.

FREDERICK WILLIAM BERTRAM PORTER.
FRANK ROBERT GEORGE GREEN.

REFERENCES CITED

The following references are of record in the file of this patent:

UNITED STATES PATENTS

| Number | Name | Date |
|---|---|---|
| 2,202,401 | Rosen | May 28, 1940 |
| 2,253,308 | Rosen | Aug. 19, 1941 |
| 2,392,579 | Cole | Jan. 8, 1946 |
| 2,413,312 | Cole | Dec. 31, 1946 |
| 2,417,308 | Lee | Mar. 11, 1947 |
| 2,500,146 | Fleck et al. | Mar. 14, 1950 |